UNITED STATES PATENT OFFICE

LEMUEL S. PENN, OF DAYTON, OHIO.

COSMETIC.

1,081,327.

Specification of Letters Patent. Patented Dec. 16, 1913.

No Drawing.

Application filed September 17, 1909. Serial No. 518,153.

*To all whom it may concern:*

Be it known that I, LEMUEL S. PENN, a citizen of the United States, residing at Dayton, in the county of Montgomery and State of Ohio, have invented certain new and useful Improvements in Cosmetics, of which the following is a full, clear, and exact description.

This invention relates to the preparation of a novel composition of matter constituting an ointment particularly applicable to the cuticle of the human body, more especially to the face, and has for its objects to provide such a cosmetic or an ointment as will give the effect of a face massage by merely spreading the ointment over the skin and allowing it to remain there for a certain length of time.

The preparation comprises what is known as "fullers' earth" which is mixed with water in a particular way, and may also contain a carmine coloring matter and some agreeable perfuming substance, such as oil of violets. The particular method of mixing the fullers' earth with the water is as follows: The earth is first mixed with a slight amount of water and then boiled, then more water is added slowly and the mixture still kept at the boiling point, and this procedure is repeated so as to retain the mass at a muddy consistency and always at the boiling point for about four or five hours. This preparation or cosmetic in its final state is a semi-liquid mass which is painted on the face with a brush to form a thin coating, and is then allowed to dry. In drying the contracting of the preparation acts as a sort of massage to give color to the skin and thoroughly clean the cuticle when the preparation is washed off. It is to be understood that the preparation in its final form as I have devised it, depends for its efficacy upon the composition of matter produced in this particular way. I have found that the mere mixing of water with fullers' earth without this boiling procedure is not efficacious and will not give the results derived from the composition of matter which I have above described, namely, the mixture produced by slow boiling and gradual addition of water. I also have found that mixing with this above described composition a small proportion of alcohol has a still further beneficial effect, in that the alcohol during the drying action of the ointment, exercises a slight skin tightening effect which results in retaining for a long time the facial color produced by this lotion or ointment application.

What is claimed is as follows:

1. As a composition of matter, a cosmetic comprising a mixture of fullers' earth and water in a semi-liquid state capable of effecting a drawing action upon the skin, produced by a slow boiling of said earth and water with the gradual addition of the water during the said boiling process.

2. As a composition of matter, an ointment comprising a mixture of fullers' earth and water in a semi-liquid state, produced by a slow boiling of said earth and water with the gradual addition of the water during the said boiling process, in combination with a sufficient proportion of alcohol to produce a skin tightening effect supplemental to the massage effect of the earth, as described.

3. A process for producing a skin massage cosmetic comprising mixing fullers' earth with water to reduce the same to a semi-liquid state, then slowly boiling this mixture, then gradually adding more water during the boiling process to replace the evaporated water and to retain the mass at a muddy consistency and at the boiling point during the gradual addition of water.

In testimony whereof I affix my signature in the presence of two subscribing witnesses.

LEMUEL S. PENN.

Witnesses:
 CHAS. D. BRONSON,
 J. B. HAYWARD.

It is hereby certified that in Letters Patent No. 1,081,327, granted December 16, 1913, upon the application of Lemuel S. Penn, of Dayton, Ohio, for an improvement in "Cosmetics," errors appear in the printed specification requiring correction as follows: Line 32, for the words "four or five hours" read *half an hour;* lines 68–69, for the words "an ointment" read *a cosmetic;* and that the said Letters Patent should be read with these corrections therein that the same may conform to the record of the case in the Patent Office.

Signed and sealed this 30th day of December, A. D., 1913.

[SEAL.]

J. T. NEWTON,
*Acting Commissioner of Patents.*